United States Patent [19]
Koch et al.

[11] Patent Number: 6,054,196
[45] Date of Patent: Apr. 25, 2000

[54] CHILDPROOF PACKAGE FOR ACTIVE SUBSTANCE PATCHES

[75] Inventors: Reinhard Koch, Sinzig/Franken, Germany; Frank Müller, Klaus/Vorarlberg, Austria; Frank Becher, Koblenz, Germany

[73] Assignee: LTS Lohmann Therapie-Systeme GmbH, Neuwied, Germany

[21] Appl. No.: 08/836,098

[22] PCT Filed: Oct. 26, 1995

[86] PCT No.: PCT/EP95/04205

§ 371 Date: Jul. 18, 1997

§ 102(e) Date: Jul. 18, 1997

[87] PCT Pub. No.: WO96/13445

PCT Pub. Date: May 9, 1996

[30] Foreign Application Priority Data

Oct. 31, 1994 [DE] Germany ............................ 44 38 527

[51] Int. Cl.[7] ............................ A61L 15/00; B65D 30/08
[52] U.S. Cl. .................... 428/34.3; 428/34.7; 428/35.2; 428/35.3; 428/36.1; 428/36.4; 428/910; 206/438; 424/447

[58] Field of Search .................. 428/34.2, 35.2, 428/35.3, 35.4, 34.7, 458, 461, 511, 513, 514, 516, 36.1, 34.3, 910, 36.4; 206/438; 424/447, 448, 449; 383/113, 116

[56] References Cited

U.S. PATENT DOCUMENTS

| | | | |
|---|---|---|---|
| 4,265,949 | 5/1981 | Kugimiya | 428/35.2 |
| 4,777,088 | 10/1988 | Thompson et al. | 428/34.2 |
| 4,806,399 | 2/1989 | Gibbons et al. | 428/34.2 |
| 4,894,264 | 1/1990 | Akao et al. | 428/34.2 |
| 5,110,639 | 5/1992 | Akao et al. | 428/35.2 |
| 5,213,858 | 5/1993 | Tanner et al. | 428/34.2 |
| 5,229,202 | 7/1993 | Tomono et al. | 420/288 |
| 5,350,622 | 9/1994 | Speer et al. | 428/35.8 |

*Primary Examiner*—Rena L. Dye
*Attorney, Agent, or Firm*—Wenderoth, Lind & Ponack, L.L.P.

[57] ABSTRACT

A childproof package for active substance patches is formed as primary package and comprises at least one mechanically tough, in particular tear-resistant layer.

13 Claims, 1 Drawing Sheet

CHILDPROOF PACKAGE FOR ACTIVE SUBSTANCE PATCHES

BACKGROUND OF THE INVENTION

1. Field of the Invention

The present invention relates to a childproof package for active substance patches.

According to a known principle, all medicines are to be kept out of reach of children. Experience of life has shown that verbal prohibitions are insufficient to keep children away from medicines within their reach if curiosity is stronger than the prohibition. In order to find a remedy and protect children from dealing with hazardous materials, childproof locks at screw caps of containers were developed and have been used for hazardous substances for some time now.

For numerous diseases and/or for controlling bodily functions, for example, regulation of blood pressure, nicotine withdrawal, family planning, etc. the application of active substance patches has gained increasing importance in the last few years, and the further development cannot be foreseen.

For several important reasons, such patches must be kept closed from production to application by means of a suitable package that ensures absolute insulation of the patch against environmental exposure on the one hand, but also against loss of active substance, for example, by sublimation, evaporation, or diffusion of volatile active substances on the other hand, and which gives a protective outward seal to the patch.

Special packaging materials have been developed for this purpose.

2. Description of Related Art

U.S. Pat. No. 5,268,209 describes a nicotine packaging material and its production process, which consists of multiple layers and, for example, has a barrier layer for nicotine made of nitrile rubber modified with acrylonitrile-methylacrylate copolymer. A reinforced copolymer of about 73 to 77%-wt. of acrylonitrile and 23 to 27%-wt. of methyl acrylate mixed with about 8 to 10 parts by weight of butadiene-acrylonitrile copolymers having about 70%-wt. of polymer units of butadiene derivative is proposed as preferred nicotine barrier material. The packaging material for nicotine comprises a sealing layer to produce packing bags, an aluminum foil, and a paper layer as support for a label.

So far, childproof packages for active substance patches have been formed such that the patch is packed up individually in an envelope suited to the nature of the active substance, for example, one being impermeable to the active substance, and that this package was protected from grasp of children, damage, or misuse by means of a tear-resistant wrapping. The double packing disadvantageously results in high packaging costs involving correspondingly heavy expenditure with respect to production and material.

BRIEF SUMMARY OF THE INVENTION

Accordingly, there is an urgent need for reducing these costs and the corresponding material expenditure without cutting down the childproof quality.

As a result, it is the object of the present invention to provide a package for active substance patches that can be manufactured at lower costs and lower material expenditure and is particularly childproof at the same time.

In a package for active substance patches, this object is achieved with the present invention by the fact that said package consists of a packaging material which has a multilayered structure and is formed as primary package, and that the packaging material has at least one layer having a mechanical loadability high enough to meet the requirements with respect to childproofness, in particular being tear-resistant, and at least one layer meeting the physical or chemical requirements of the active substance, at least being impermeable to vapor and/or active substances.

DETAILED DESCRIPTION OF THE INVENTION

Figure 1:
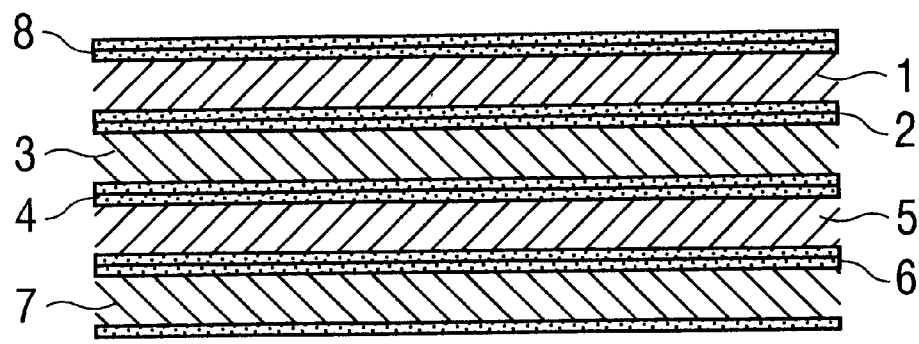
FIG. 1 shows the structure of the childproof package of the invention.

On the one hand, the childproof package for active substance patches according to the present invention most advantageously has the mechanical strength characteristics effectively ensuring that a child is prevented from opening and accessing the patch with its hands, i.e., without using mechanical aids, such as scissors, knives, or the like. On the other hand, the layered structure of the packaging material comprises a special barrier layer to seal the active substance in a suitable and complete manner or to prevent active substance loss into the environment.

Since the childproof package is formed according to the present invention exclusively as a primary package, double packing required so far can be omitted; for this reason approximately 50% of packaging work involving the necessary machine utilization and material expenditure is dropped. Most advantageously this not only saves expenses, but also is the environment relieved from waste and waste disposal, respectively.

Further embodiments provide that the tear-resistant layer is a biaxially stretched polyamide film.

However with respect to choosing a suitable packaging material, the present invention shall not be limited to the use of a polyamide film as a tear-resistant layer. A great variety of high-strength materials is suitable, for example, materials of aramide fibers (e.g. Kevlar®).

Also, tear-resistant layers manufactured by insertion of high-strength fibers or fabrics, for example, of thin polyester threads, glass fibers, steel fabrics, or of other combinations are suitable for the layered structure of the packaging material according to the present invention. The insertions or reinforcing fibers may be inserted between two layers or integrated in one layer.

Another embodiment further provides that the outer layer is a stock made of-paper or that it is coated with printed paper.

It is preferred that an aluminum foil or an aluminized plastic film be used as layer that is impermeable to the active substance. Finally, an embodiment provides that the innermost layer is a plastic film either laminated with a sealing medium or consisting of a sealant.

The layered structure of the packaging material may further be formed such that the heavy-duty, tear-resistant layer is located in the outer region of the layered structure, and that the layer which suits to the physical or chemical requirements of the active substance and is impermeable to vapor and active substance is located in the inner region of the layered structure, or vice versa.

The layered structure of the packaging material preferably includes:

paper (1)

laminating adhesive (2)

aluminum foil (3)

laminating adhesive (4)

tear-resistant layer (5) (polyamide film)

laminating adhesive (6)

polyacrylonitrile (7)

In order to render damage to or destruction of the package more difficult for children, it may additionally be provided that the outside of the paper layer (1) is rendered antiadhesive by means of a slip layer (8) reducing the adherence of fingers to the package.

An embodiment of the layer structure of the packaging material provided according to the present invention for the childproof package for active substance patches is shown in the FIG. 1. The drawing showing a section through the layered structure, with the following meaning:

A paper layer (1) of good paper quality, for example, of coated or supercalandered uncoated paper, a laminating adhesive (2), for example, of a thermally activatable glue, an aluminum foil (3), a laminating adhesive (4), a tear-resistant layer (5), for example, a polyamide film or a sheet of aramide, or a plastic film reinforced with reinforcing fibers, a laminating adhesive (6), an inner layer of polyacrylonitrile (7).

If necessary, the material may be rendered antiadhesive at the outer paper layer (1) using a slip layer (8) reducing the adhesion of fingers to the package. This additionally renders the use of force at the package more difficult.

An exemplary weight indication ($g/m^2$) for the individual layers preferably has the following values:

paper (1) (40.0 $g/m^2$)

laminating adhesive (2) (2.0 $g/m^2$)

aluminum foil (3) (24.3 $g/m^2$)

laminating adhesive (4) (2.0 $g/m^2$)

tear-resistant layer (polyamide film) (5) (17.2 $g/m^2$)

laminating adhesive (6) (2.0 $g/m^2$)

polyacrylonitrile (7) (32.2 $g/m^2$)

The childproof package may also be such that the layer having a high mechanical load-carrying capacity consists either of two films with inserted reinforcing material or of one single film with integrated reinforcing material.

Moreover, the childproof package may consist of two heavy-duty surface parts; but it is also possible to take measures resulting in the fact that the package consists of a high-strength material portion and a less stable material portion.

A process for the production provides that the patch is inserted between two surface elements of the packaging material, and that the edges of the surface portions are sealed to each other.

The childproof package for active substance patches formed as primary package made of a packaging material having a multilayer structure according to the present invention is uncomplicated, practical and—as compared to the previous double package—can be manufactured very economically, relieving the environment by saving waste at the same time.

For this reason, the present invention achieves the above object in an optimum manner.

We claim:

1. A multi-layered childproof package for an active substance-containing patch or patches wherein the patch or patches are liable to alteration by environmental interchange, said childproof package being a primary package made of a composite comprising at least one tear-resistant layer formed of a biaxially stretched polyamide film, a foil of a material containing aramide fibers, or a film-forming material having at least one insertion of high-strength fibers or fabrics, and at least one layer of aluminum film or an aluminized plastic film which is impermeable to the active substance, whereby both said layers are connected so that the materials are tightly adjacent, said active substance-containing patch or patches being enveloped by the multi-layered childproof package.

2. The childproof package of claim 1, wherein the impermeable layer is additionally impermeable to water vapor.

3. The childproof package according to claim 1, wherein the tear-resistant layer is a biaxially stretched polyamide film.

4. The childproof package according to claim 1, wherein the tear-resistant layer is a material containing aramide fibers.

5. The childproof package according to claim 1, wherein the tear-resistant layer is of a film-forming material having at least one insertion of high-strength fibers or fabrics of polyester, polyamide, glass or steel.

6. The childproof package according to claim 1, wherein the tear-resistant layer consists either of two films having inserted between them a reinforcing material or of one single film with integrated reinforcing material.

7. The childproof package according to claim 1, further comprising an outer layer which is a stock made of paper.

8. The childproof package according to claim 6, further comprising an innermost layer of the package facing the patch or patches and which is a plastic film either laminated with a sealing medium or consisting of a sealing medium.

9. The childproof package according to claim 1, wherein the layered structure of the packaging materials includes:

paper (1)

laminating adhesive (2)

aluminum foil (3)

laminating adhesive (4)

tear-resistant layer (5)

laminating adhesive (6)

polyacrylonitrile (7).

10. The package according to claim 9, wherein the outside of the paper layer (1) is rendered anti-adhesive with a slip layer (8) reducing the adherence of fingers to the package.

11. The childproof package according to claim 1, wherein a surface portion thereof consists of packaging material having a mechanically tough, tear-resistant layer (5) and that the opposite surface portion consists of a less loadable packaging material.

12. The childproof package according to any one of claims 1, 2–7 or 8, wherein the tear resistant layer is located in the outer region of the layered structure and the impermeable layer is located in the inner region of the layered structure; or the impermeable layer is located in the outer region of the layered structure and the tear-resistant layer is located in the inner region of the impermeable layer.

13. A process for the production of an active substance-containing patch enveloped by said childproof package according to claim 1, wherein at least one patch is inserted between two surface portions of the packaging material and that the edges of the surface portions are sealed with each other.

* * * * *